(12) United States Patent
Takahashi et al.

(10) Patent No.: US 12,116,066 B2
(45) Date of Patent: Oct. 15, 2024

(54) VEHICLE INSPECTION METHOD AND VEHICLE INSPECTION SYSTEM

(71) Applicant: TOYOTA JIDOSHA KABUSHIKI KAISHA, Toyota (JP)

(72) Inventors: Tatsuhiro Takahashi, Nagakute (JP); Hiromitsu Kamata, Toyota (JP); Satoru Koshi, Nisshin (JP); Kazuki Inoue, Toyota (JP); Tetsuya Tamoto, Nagoya (JP); Tooru Nishimura, Toyota (JP); Kiyoshi Suzuki, Nagoya (JP); Shinya Imai, Toyota (JP); Seiya Shibata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 423 days.

(21) Appl. No.: 17/526,555

(22) Filed: Nov. 15, 2021

(65) Prior Publication Data

US 2022/0194502 A1 Jun. 23, 2022

(30) Foreign Application Priority Data

Dec. 22, 2020 (JP) ................................. 2020-212531

(51) Int. Cl.
*B62D 65/00* (2006.01)
*G01N 21/88* (2006.01)
(52) U.S. Cl.
CPC ....... *B62D 65/005* (2013.01); *G01N 21/8851* (2013.01)

(58) Field of Classification Search
CPC .. B62D 65/005; G01N 21/8851; G01N 21/84; G01N 2021/8411; G01M 17/007
(Continued)

(56) References Cited

U.S. PATENT DOCUMENTS 7,330,783 B2 \* 2/2008 Tsubota ............... B62D 65/005
701/29.3
2016/0253851 A1 \* 9/2016 Pandey ................ G07C 5/0808
701/31.4
(Continued)

FOREIGN PATENT DOCUMENTS

JP 2006-258489 A 9/2006
JP 2007-280012 A 10/2007
(Continued)

*Primary Examiner* — Christopher P McAndrew
*Assistant Examiner* — Byung Ro Lee
(74) *Attorney, Agent, or Firm* — Oblon, McClelland, Maier & Neustadt, L.L.P.

(57) ABSTRACT

A vehicle inspection method in a production line of a vehicle includes: performing a part inspection in steps of manufacturing parts of the vehicle, the part inspection in which each of the parts after being manufactured is inspected with an inspection device and which includes one or more inspection items; storing a result of the part inspection in a storage device such that the result is associated with the part; and displaying the result of the part inspection, on a display device used in a completed vehicle inspection for inspecting a completed vehicle serving as the vehicle that is completed, information indicating at least the part of the parts corresponding to a failed item serving as the inspection item which is determined not to be passed in the result of the part inspection stored in the storage device and information indicating the failed item.

6 Claims, 13 Drawing Sheets

(58) Field of Classification Search
USPC .......................................................... 702/82
See application file for complete search history.

(56) References Cited

U.S. PATENT DOCUMENTS

2019/0164270 A1* 5/2019 Wardell ................. G06N 20/00
2019/0221057 A1* 7/2019 Shibata .................. H04W 4/48
2020/0217751 A1* 7/2020 Sato ........................ G07C 3/14

FOREIGN PATENT DOCUMENTS

JP          2010-223834 A     10/2010
JP          2011-154463 A      8/2011

* cited by examiner

Fig.4

| VEHICLE ID | INSPECTION ITEM | PRODUCTION INSTRUCTION | INSPECTION RESULT | IMAGE USED |
|---|---|---|---|---|
| 12345 | FUEL TANK ERRONEOUS COMPONENT INSPECTION | V1 | NG | AAAA.jpg |
| 12345 | CONNECTOR ATTACHMENT INSPECTION | 220L | OK | BBBB.jpg |
| | | | | |

221

VEHICLE INSPECTION METHOD AND VEHICLE INSPECTION SYSTEM

CROSS REFERENCE TO RELATED APPLICATIONS

This application claims priority based on Japanese Patent Application No. 2020-212531 filed on Dec. 22, 2020 the entire disclosure of which is hereby incorporated by reference.

BACKGROUND

Field

The present disclosure relates to inspections of vehicles in a production line of the vehicles.

Related Art

In the production line of a vehicle, in each of manufacturing steps including the assembly of the parts of the vehicle, inspections may be performed after the completion of an operation. Since it is likely that inspections for each manufacturing step are not performed due to, for example, a lack of man-hours, in order to ensure reliable inspections for the parts, inspections are also performed in the state of a completed vehicle in which the manufacturing of the parts is completed (see Japanese Unexamined Patent Application Publication No. 2010-223834).

However, inspection items in the inspections for the manufacturing steps of the parts (hereinafter referred to as "part inspections") and inspection items in the inspections for the completed vehicle (hereinafter referred to as "completed vehicle inspections") overlap each other, and thus useless inspections are performed, with the result that productivity is disadvantageously lowered. Hence, the completed vehicle inspections are omitted, and thus it is disadvantageously impossible to ensure the reliable inspections as described above. For an inspection for a part in which it is difficult to perform the inspection in the state of the completed vehicle, for example, an inspection for a part which is covered with other parts and in which the other parts need to be removed for the inspection, the inspection is preferably performed in the part inspections, and thus there is a problem for arbitrary omission of inspection items in the part inspections. Hence, a technique is desired with which it is possible to reduce the overlapping of inspection items between part inspections and completed vehicle inspections without unnecessarily omitting inspection items.

SUMMARY

According to an aspect of the present disclosure, a vehicle inspection method in a production line of a vehicle is provided. The vehicle inspection method includes: performing a part inspection, in steps of manufacturing parts of the vehicle, the part inspection in which each of the parts after being manufactured is inspected with an inspection device and which includes one or more inspection items; storing a result of the part inspection in a storage device such that the result is associated with the part; and displaying the result of the part inspection, on a display device used in a completed vehicle inspection for inspecting a completed vehicle serving as the vehicle that is completed, information indicating at least the part of the parts corresponding to a failed item serving as the inspection item which is determined not to be passed in the result of the part inspection stored in the storage device and information indicating the failed item.

BRIEF DESCRIPTION OF THE DRAWINGS

FIG. 4 is an illustrative view showing an example of details recorded in an inspection result database;

DETAILED DESCRIPTION

A. Embodiment

Figure 1:
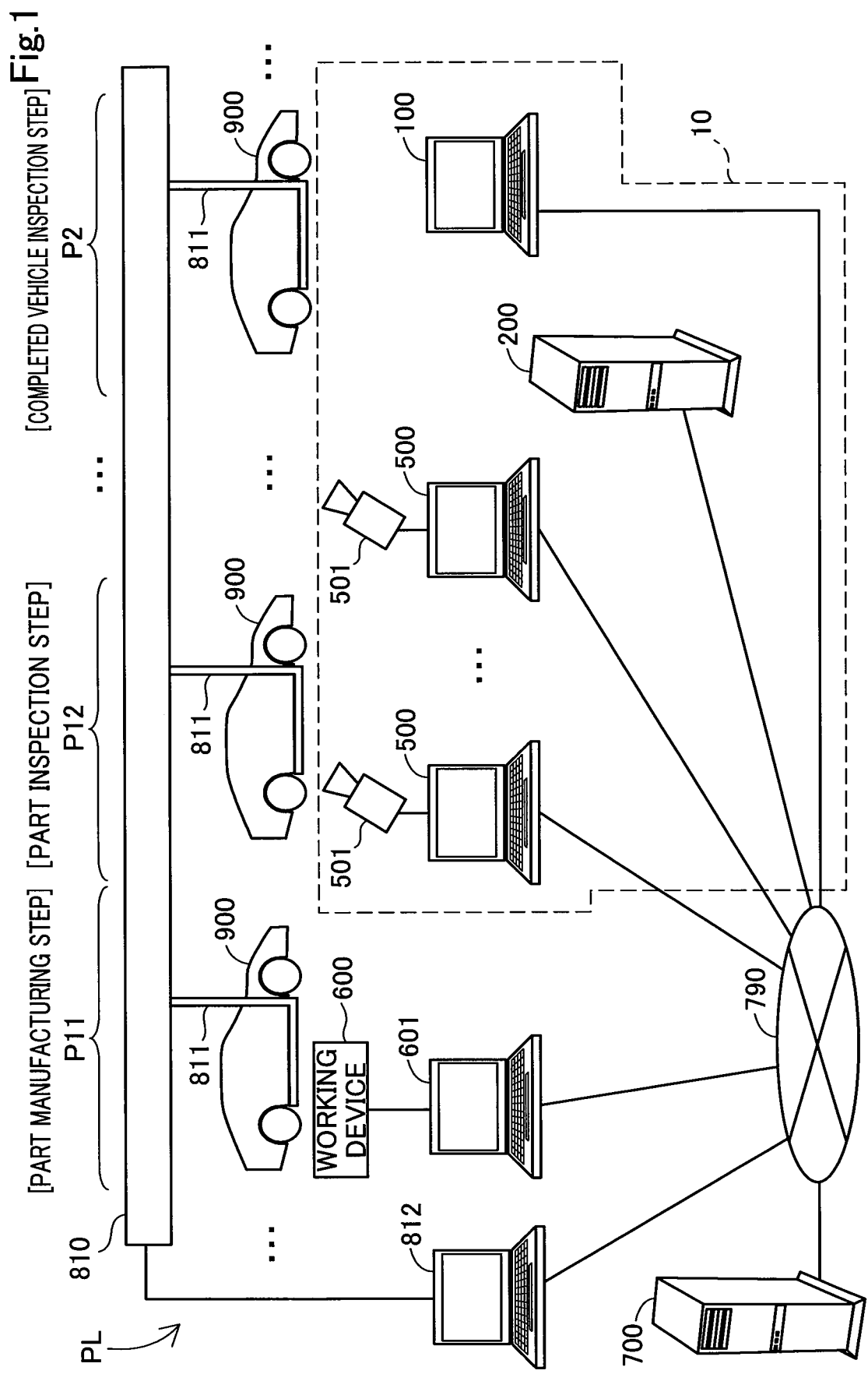
FIG. 1 is an illustrative view showing a schematic configuration of a vehicle inspection system according to an embodiment of the present disclosure.

A1. System Configuration:

FIG. 1 is an illustrative view showing a schematic configuration of a vehicle inspection system 10 according to an embodiment of the present disclosure. The vehicle inspection system 10 performs inspections on vehicles 900 which are targets to be produced in the production line PL of the vehicles 900 provided within a factory. In the production line PL, while the vehicles 900 are being transported with a transport device 810, a part manufacturing step P11, a part inspection step P12 and a completed vehicle inspection step P2 are performed. FIG. 1 shows only a portion of the production line PL. In the present embodiment, the "vehicle 900" has a broad meaning including a completed vehicle, that is, a vehicle in a state where all manufacturing and inspections are completed and where the vehicle is able to be shipped, a vehicle being manufactured and a vehicle in which manufacturing is completed but an inspection (completed vehicle inspection described later) is not completed.

Under the control of a transport control device 812, the transport device 810 moves hangers 811 along a predetermined route to transport the vehicles 900 hung by the hangers 811. The transport control device 812 controls the transport of the vehicles 900 according to an instruction from a control device 700 for a factory production system. The factory production system is a system which comprehensively controls the production of the vehicles 900 within the factory. The vehicle inspection system 10 is incorporated as a portion of this factory production system. The control device 700 for the factory production system identifies in which position each of the vehicles 900 is located within the production line PL, and transmits an instruction for processing corresponding to the position in the production line PL to a control device which controls the processing described above. The transport control device 812 and the control device 700 described above are connected to a factory network 790. The factory network 790 may be configured with, for example, a wired LAN (Local Area Network), a wireless LAN or the like. The positions of the vehicles 900 in the production line PL are grasped by the transport control device 812 based on the amounts of feed of the hangers 811. Wireless tags are attached to the vehicles 900, in the part manufacturing step P11 and the part inspection step P12, the information of the wireless tags is read with unillustrated sensors arranged along the production line PL and thus it is possible to identify the detailed positions of the vehicles 900.

In the part manufacturing step P11, processing such as the assembly of the parts of the vehicle 900 and welding is performed to manufacture the parts. For example, the assembly of parts of an interior and an exterior such as the installation of a fuel tank, the assembly of a chassis such as a frame and a suspension and the devices of an engine drive system such as an engine, a brake and a transmission and the like are performed. In the part manufacturing step P11 shown in FIG. 1, a working device 600 for performing working on a certain part of the vehicle 900 and a working control device 601 which controls the working device 600 are arranged. The working device 600 is, for example, a laser device for performing laser welding on a predetermined portion, a robot or the like. The working control device 601 controls the working device 600 to control, for example, a laser output in the working device 600. The working control device 601 is connected to the factory network 790, and controls the working device 600 according to a production instruction received through the factory network 790 from the control device 700 so as to control, for example, the laser output. The control device 700 transmits, through the factory network 790, to the working control device 601, the vehicle ID of the vehicle 900, the position information of the vehicle 900 and information indicating an instruction to perform working. When the working control device 601 identifies, based on the position information received from the control device 700, that the vehicle 900 reaches a predetermined working position, the working control device 601 performs, for example, an operation for working such as the application of laser light according to the instruction to perform working while identifying the detailed position of the vehicle 900 from the result of detection of a sensor.

In the part inspection step P12, an inspection (hereinafter referred to as a "part inspection") for the part manufactured in the part manufacturing step P11 is performed. The part manufacturing step P11 and the part inspection step P12 are performed as a set. Specifically, the part manufacturing step P11 is performed for each of the parts, and the part inspection step P12 (part inspection) is performed as the immediately downstream step. Then, when the part inspection step P12 is completed, the part manufacturing step P11 and the part inspection step P12 for another part are performed. In the part inspection step P12, a part inspection device 500 which will be described later inspects an inspection item which is previously set for each of components. Here, the inspection is performed by utilization of images. The details of the part inspection will be described later.

In the completed vehicle inspection step P2, an inspection (hereinafter referred to as a "completed vehicle inspection") for the vehicle 900 serving as the completed vehicle in which the manufacturing of the parts is completed is performed. The completed vehicle inspection is visually performed by an inspector. Here, completion inspection guide processing is performed in a completed vehicle inspection terminal 100 which will be described later. In this way, the inspector is able to efficiently perform the completion inspection. The details of the completion inspection guide processing will be described later.

As shown in FIG. 1, the vehicle inspection system 10 includes a plurality of part inspection devices 500, image sensing devices 501 which are connected to the part inspection devices, a part inspection result storage device 200 and the completed vehicle inspection terminal 100.

Figure 2:
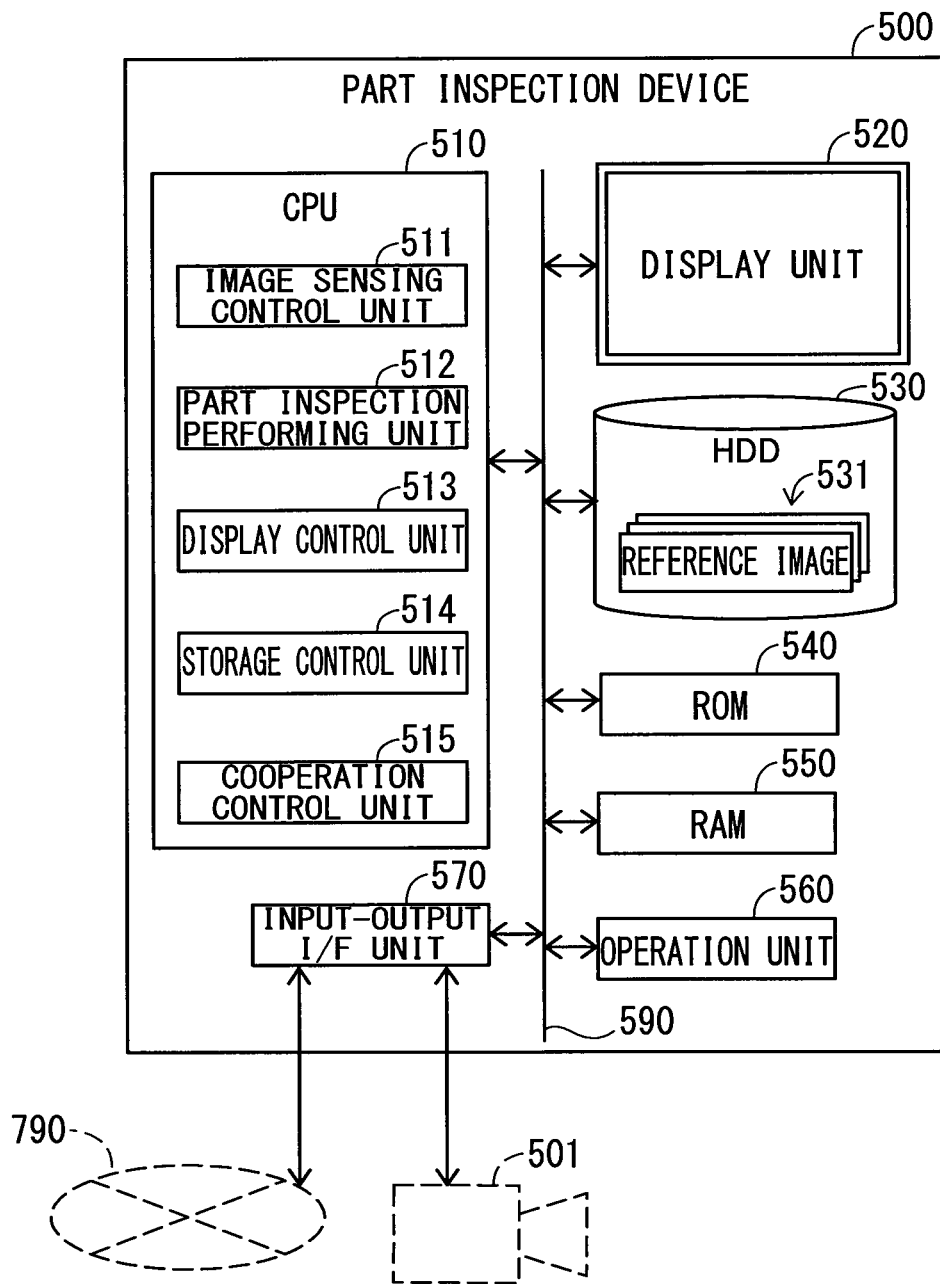
FIG. 2 is a block diagram showing a detailed configuration of a part inspection device.

FIG. 2 is a block diagram showing a detailed configuration of the part inspection device 500. The part inspection device 500 performs the control of image sensing performed by the image sensing device 501 and the part inspection. As an inspection item in the part inspection, one or more inspection items are previously set for each of the parts. Examples of the inspection item include an inspection item of "whether the correct component to be assembled is assembled (erroneous component inspection)", an inspection item of "whether the component is securely assembled" and an inspection item of "whether a scratch is not made in the component".

In the present embodiment, the part inspection device 500 is configured with a computer. As shown in FIG. 2, the part inspection device 500 includes a CPU 510, a ROM 540, a RAM 550, a display unit 520, a hard disk 530, an operation unit 560 and an input-output I/F unit 570. These constituent elements are configured to be able to exchange data with each other through an internal bus 590. The CPU 510 develops control programs previously stored in the hard disk 530 to the RAM 550 and executes them so as to function as an image sensing control unit 511, a part inspection performing unit 512, a display control unit 513, a storage control unit 514 and a cooperation control unit 515.

The image sensing control unit 511 controls the image sensing device 501 connected through the input-output I/F unit 570 to perform image sensing so as to include the part manufactured in the part manufacturing step P11, and thereby acquires a sensed image.

The image sensing device 501 is fixedly installed, in a region of the production line PL where the part inspection step P12 is performed, in a predetermined position in a predetermined direction. The image sensing device 501 includes, for example, an image sensing element such as a CMOS (Complementary Metal Oxide Semiconductor) image sensor, and performs image sensing according to an instruction from the image sensing control unit 511 to acquire sensed image data. The number of image sensing devices 501 installed is one or greater, and FIG. 1 schematically shows that only one image sensing device is installed.

The part inspection performing unit 512 uses the sensed image obtained with the image sensing device 501 to perform the part inspection. Specifically, the part inspection performing unit 512 compares a reference image 531 previously stored in the hard disk 530 and the sensed image and determines that the part inspection for the corresponding part is passed when the degree of matching of both the images (hereinafter referred to as the "degree of matching") falls within a predetermined range. On the other hand, when the degree of matching of both the images falls outside the predetermined range, the part inspection performing unit 512 determines that the part inspection for the corresponding part is failed. The reference image 531 is an image which is obtained when the part to be manufactured in the part inspection step P12 is normally manufactured, and is prepared for each of the parts. A more detailed example of the part inspection will be described later.

The display control unit 513 controls a display on the display unit 520. The display control unit 513 displays, on the display unit 520, a dedicated window (hereinafter referred to as a "part inspection result display window") which shows the result of the part inspection, and which will be described later.

The storage control unit 514 stores the sensed image obtained with the image sensing device 501 and the result of the part inspection in the part inspection result storage device 200 through the factory network 790.

In order to operate the part inspection device 500 in cooperation with the factory production system, the cooperation control unit 515 exchanges data with the control device 700 through the factory network 790. Specifically, the cooperation control unit 515 receives the position information of the vehicle 900 transmitted from the control device 700 and an instruction such as an operation instruction, and controls, according to the received instruction, the image sensing control unit 511, the part inspection performing unit 512, the display control unit 513 and the storage control unit 514. The cooperation control unit 515 as described above is included not only in the part inspection device 500 but also in the transport control device 812 and the working control device 601 described previously. The cooperation control unit 515 is likewise included in the completed vehicle inspection terminal 100 which will be described later.

The display unit 520 displays the part inspection result display window described above. The hard disk 530 previously stores the reference image 531 described above. The operation unit 560 is formed with, for example, a keyboard, and receives an input produced by a user. The input-output I/F unit 570 includes a connection interface with the image sensing device 501 and a connection interface with the factory network 790.

Figure 3:
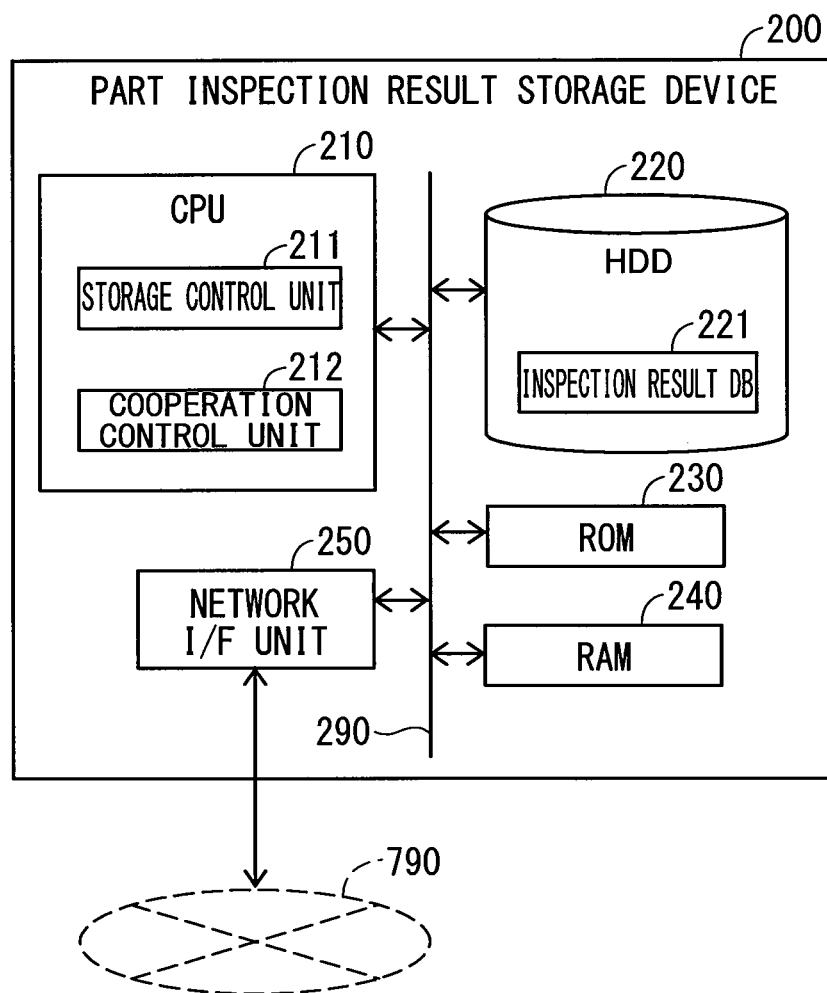
FIG. 3 is a block diagram showing the configuration of a part inspection result storage device.

FIG. 3 is a block diagram showing the configuration of the part inspection result storage device 200. The part inspection result storage device 200 stores the result of the part inspection performed in the part inspection device 500 and the sensed image obtained with the image sensing device 501. Here, the part inspection result storage device 200 stores the result of the inspection and the sensed image such that they are associated with the vehicle ID and the part to be inspected.

In the present embodiment, the part inspection result storage device 200 is configured with a computer. As shown in FIG. 3, the part inspection result storage device 200 includes a CPU 210, a ROM 230, a RAM 240, a hard disk 220 and a network I/F unit 250. These constituent elements are configured to be able to exchange data with each other through an internal bus 290. The CPU 210 develops control programs previously stored in the hard disk 220 to the RAM 240 and executes them so as to function as a storage control unit 211 and a cooperation control unit 212.

The storage control unit 211 writes data into an inspection result database 221 stored in the hard disk 220 and reads data from the inspection result database 221. Since the cooperation control unit 212 is a function unit which has the same function as the cooperation control unit 515 of the part inspection device 500 described above, the detailed description thereof will be omitted.

In the hard disk 220, the inspection result database 221 is stored. The inspection result database 221 stores information on the part inspections and specifically the vehicle IDs, the parts to be inspected, the results of the inspections and the sensed images such that they are associated with each other.

FIG. 4 is an illustrative view showing an example of details recorded in the inspection result database 221. Each of the records of the inspection result database 221 includes a vehicle ID field, an inspection item field, a production instruction field, an inspection result field and an image used field. In the vehicle ID field, the vehicle ID for identifying the vehicle 900 is stored. In the inspection item field, the inspection item performed in the part inspection is stored. In the production instruction field, the production instruction which triggers the performance of the inspection item, and which is received from the control device 700 is stored. In the inspection result field, the result of the part inspection is stored to be "OK" (passed) or "NG" (failed). In the image used field, the file name of image data used in the part inspection is stored. The image data itself is stored in the hard disk 220. Specific details stored in the two records shown in FIG. 4 will be described later.

The hard disk 220 shown in FIG. 3 stores the control programs described above and the inspection result database 221. The network I/F unit 250 includes a connection interface with the factory network 790.

Figure 5:
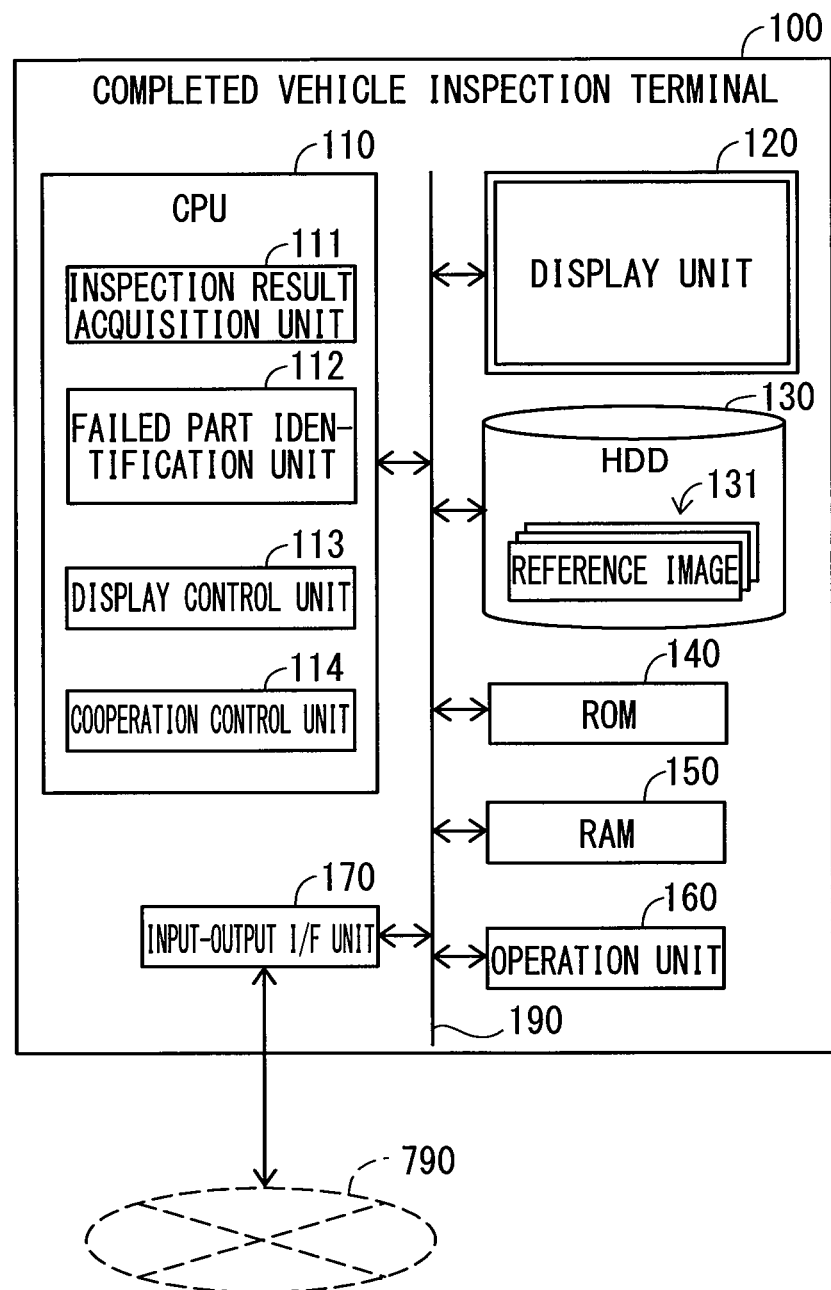
FIG. 5 is a block diagram showing the configuration of a completed vehicle inspection terminal.

FIG. 5 is a block diagram showing the configuration of the completed vehicle inspection terminal 100. In the completed vehicle inspection terminal 100, the completion inspection guide processing which will be described later is performed, the vehicle and the inspection item to be inspected are displayed for the inspector who performs the completion inspection and thus the inspection is guided. In the present embodiment, the completed vehicle inspection terminal 100 is configured with a computer. As shown in FIG. 5, the completed vehicle inspection terminal 100 includes a CPU 110, a ROM 140, a RAM 150, a display unit 120, a hard disk 130, an operation unit 160 and an input-output I/F unit 170. These constituent elements are configured to be able to exchange data with each other through an internal bus 190. The CPU 110 develops control programs previously stored in the hard disk 130 to the RAM 150 and executes them so as to function as an inspection result acquisition unit 111, a failed part identification unit 112, a display control unit 113 and a cooperation control unit 114.

The inspection result acquisition unit 111 acquires data on the result of the part inspection and specifically the data stored in the inspection result database 221 and the sensed image data through the factory network 790 from the part inspection result storage device 200. The failed part identification unit 112 identifies a failed part based on the data acquired by the inspection result acquisition unit 111. The "failed part" means a part of the parts of the vehicle 900 which corresponds to the inspection item that does not satisfy a predetermined criterion. The display control unit 113 controls a display on the display unit 120. The display control unit 113 displays, on the display unit 120, a window (hereinafter referred to as an "inspection guide window") for guiding the inspector on the inspection in the completed vehicle inspection. Since the cooperation control unit 114 is a function unit which has the same function as the cooperation control unit 515 of the part inspection device 500 described above, the detailed description thereof will be omitted.

The part inspection device 500 corresponds to an "inspection device" in the present disclosure. The part inspection result storage device 200 corresponds to a "storage device" and a "storage unit" in the present disclosure, the display unit 120 in the completed vehicle inspection terminal 100 corresponds to a "display device" in the present disclosure, the display control unit 113 in the completed vehicle inspection terminal 100 corresponds to a "display control device" in the present disclosure, the inspection result acquisition unit 111 and the failed part identification unit 112 in the completed vehicle inspection terminal 100 correspond to an "inspection result determination device" in the present disclosure and the image sensing control unit 511 in the part inspection device 500 corresponds to an "image sensing control device" in the present disclosure.

Figure 6:
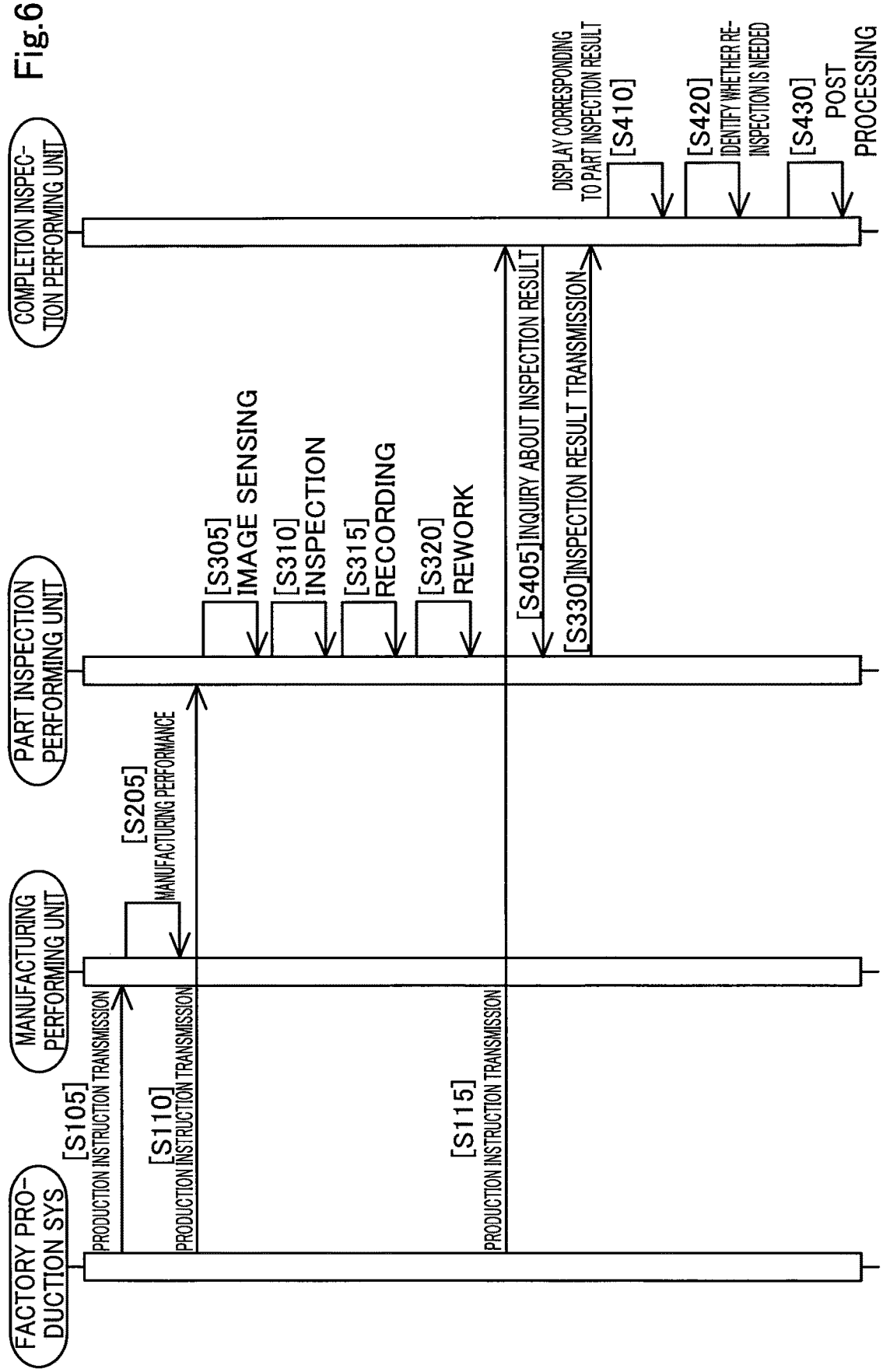
FIG. 6 is a sequence diagram showing a processing sequence in the manufacturing and the inspections of a vehicle.

A2. Processing Sequence in Manufacturing and Inspections of Vehicle:

FIG. 6 is a sequence diagram showing a processing sequence in the manufacturing and the inspections of the vehicle 900. In FIG. 6, a procedure on the left end thereof indicates a processing procedure in the factory production system, the second procedure from the left end indicates a procedure for a manufacturing performing unit, the third procedure from the left end indicates a procedure for the part inspection performing unit and a procedure on the right end thereof indicates a procedure for a completion inspection performing unit. The "factory production system" in FIG. 6 is, for example, the transport control device 812 and the control device 700 shown in FIG. 1. The "manufacturing performing unit" is, for example, the working control device 601 and the working device 600 shown in FIG. 1. The "part inspection performing unit" is, for example, the part inspection device 500 shown in FIG. 1. The "completion inspection performing unit" is, for example, the completed vehicle inspection terminal 100 shown in FIG. 1.

As shown in FIG. 6, in the factory production system, the control device 700 transmits, to the manufacturing performing unit, a production instruction including the vehicle ID of each vehicle 900 (step S105). For example, when as described previously, the working device 600 performs laser welding, the control device 700 transmits, to the working control device 601 serving as the control device for the working device 600, an instruction indicating that "laser welding is performed" together with the vehicle ID.

When the manufacturing performing unit receives the production instruction through the factory network 790, the manufacturing performing unit starts the manufacturing (step S205). In the factory production system, the control device 700 transmits the production instruction including the vehicle ID to the part inspection device 500 that performs the part inspection corresponding to the working control device 601 to which the production instruction is transmitted in step S105 (step S110).

When in the part inspection performing unit, that is, the part inspection device 500, the image sensing control unit 511 receives the production instruction from the control device 700, the image sensing control unit 511 controls the image sensing device 501 to sense an image of the part to be inspected (step S305). In other words, the part to be sensed means the part which is manufactured in step S205 of the part manufacturing step P11 which is the immediately preceding step.

Figure 7:
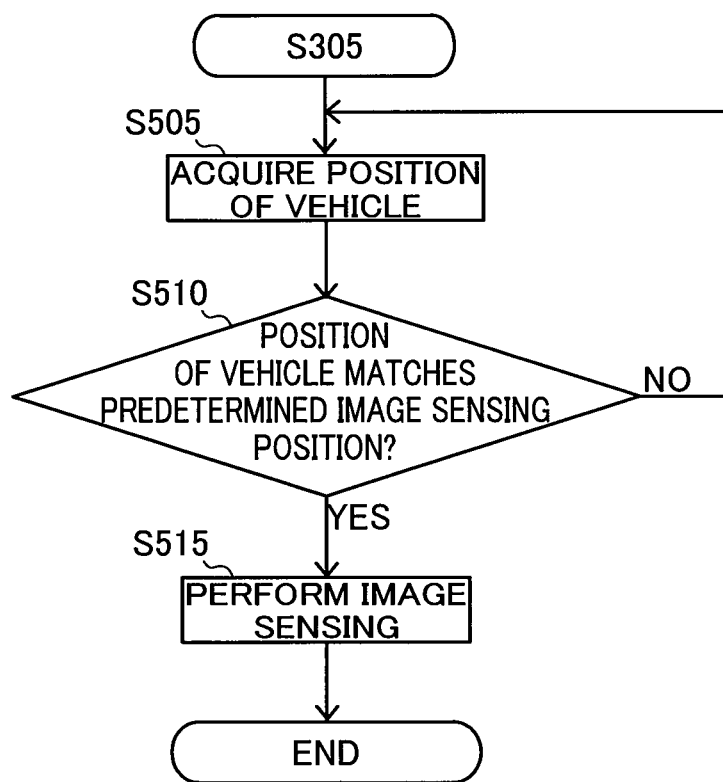
FIG. 7 is a flowchart showing a detailed procedure for step S305.

FIG. 7 is a flowchart showing a detailed procedure for step S305. The image sensing control unit 511 acquires the position of the vehicle 900 having the vehicle ID included in the received production instruction (step S505). Specifically, the image sensing control unit 511 makes an inquiry about the position of the vehicle 900 having the vehicle ID to the transport control device 812 through the factory network 790 so as to acquire the position, and also receives the result of detection performed by an unillustrated sensor so as to acquire the more detailed position of the vehicle 900. The image sensing control unit 511 determines whether or not the acquired position of the vehicle 900 matches a predetermined image sensing position (step S510). The predetermined image sensing position is previously identified and set as a position and a direction in which it is possible to obtain a sensed image suitable for the part inspection. In other words, the "sensed image suitable for the part inspection" means the same position as that of the vehicle 900 when the reference image is sensed.

When it is determined that the acquired position of the vehicle 900 matches the predetermined image sensing position (step S510: yes), the image sensing control unit 511 controls the image sensing device 501 to perform image sensing (step S515). On the other hand, when it is determined that the acquired position of the vehicle 900 does not match the predetermined image sensing position (step S510: no), the processing returns to step S505 described above.

As shown in FIG. 6, after the completion of step S305, in the part inspection device 500, the part inspection performing unit 512 uses the sensed image obtained in step S305 and the reference image 531 stored in the hard disk 530 to perform the part inspection (step S310).

Figure 8:
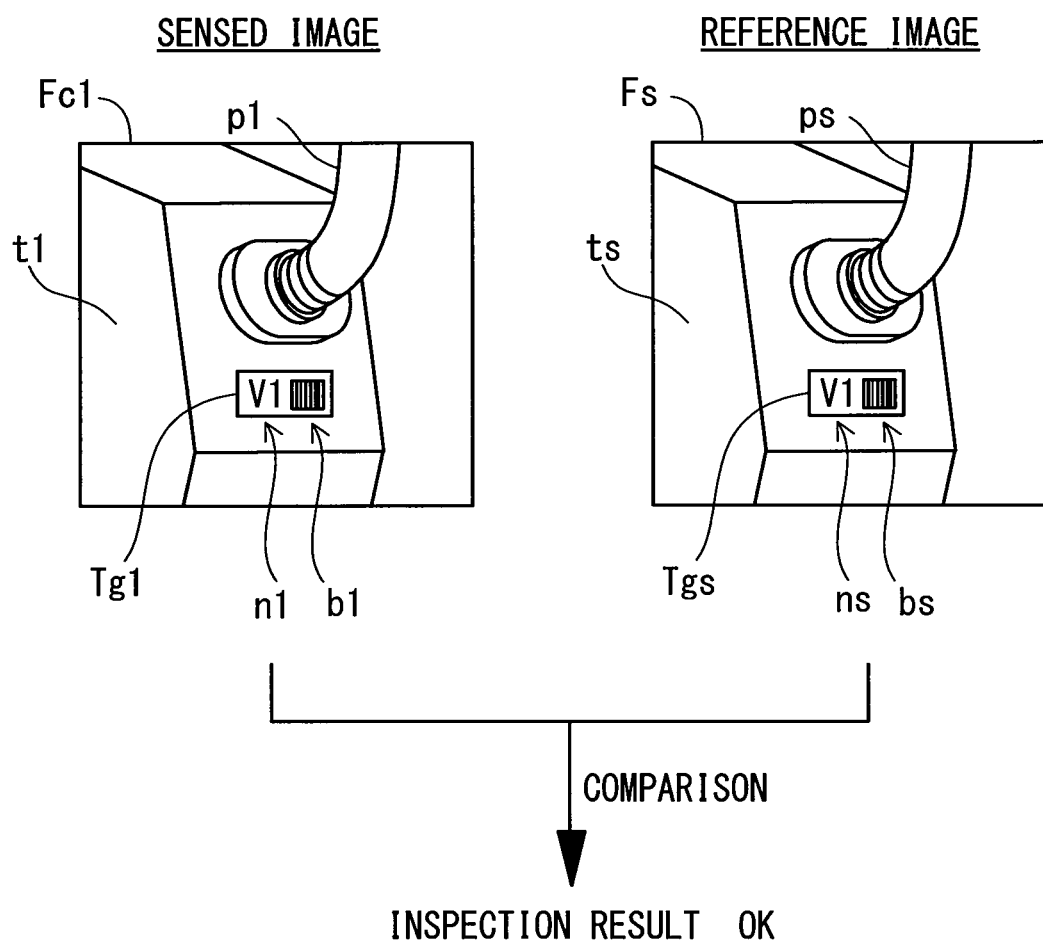
FIG. 8 is an illustrative view for illustrating a method for a part inspection.
Figure 9:
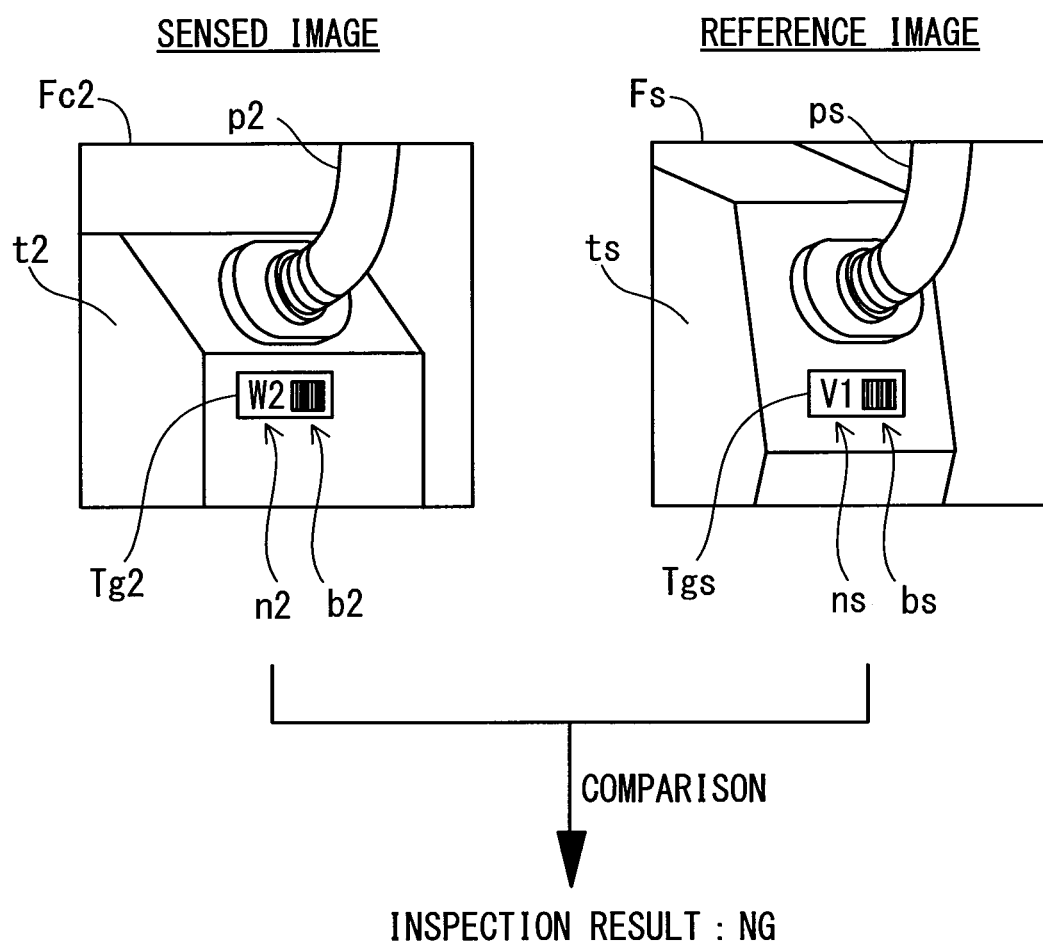
FIG. 9 is an illustrative view for illustrating the method for the part inspection.

FIGS. 8 and 9 are illustrative views for illustrating a method for the part inspection. FIG. 8 shows a case where the result of the part inspection is passed (OK), and FIG. 9 shows a case where the result of the part inspection is failed (NG).

On the left side of FIG. 8, a sensed image Fc1 obtained in step S305 is shown. On the right side of FIG. 8, a reference image Fs serving as an example of the reference image 531 is shown. The reference image Fs is the reference image of the same part as the sensed image Fc1.

In the sensed image Fc1, a region is depicted which includes a portion of a fuel tank t1 and a fuel pipe p1 connecting a filler neck and the fuel tank t1 together. In the region described above, a display tag Tg1 is stuck to the surface of the fuel tank t1. In the display tag Tg1, a character string n1 indicating the type of fuel tank t1 and a barcode b1 including the information of the type of fuel tank t1 and the like are described.

In the reference image Fs, a region is depicted which includes a portion of a fuel tank ts serving as a reference and a fuel pipe ps connecting a filler neck and the fuel tank ts together. In the region described above, a display tag Tgs is stuck to the surface of the fuel tank U. In the display tag Tgs, a character string ns indicating the type of fuel tank ts and a barcode bs including the information of the type of fuel tank ts and the like are described.

In the present embodiment, the part inspection performing unit 512 compares the character string n1 described in the display tag Tg1 depicted in the sensed image Fc1 and the character string ns described in the display tag Tgs depicted in the reference image Fs to identify the degree of matching, and the part inspection performing unit 512 determines that this inspection is passed when the degree of matching falls within a predetermined range whereas the part inspection performing unit 512 determines that this inspection is failed when the degree of matching falls outside the predetermined range. In the present embodiment, the "predetermined range" described above means a range of "97% or greater" when it is assumed that the degree of matching in the case of perfect matching is 100% and that the degree of matching in the case of no matching is 0%. The "predetermined range" is not limited to the range of 97% or greater, and any numerical range which is greater than 50% may be set.

In the example of FIG. 8, the character string n1 described in the display tag Tg1 depicted in the sensed image Fc1 and the character string ns described in the display tag Tgs depicted in the reference image Fs are "V1" so as to match each other, with the result that this inspection is determined to be "passed" (OK). As a method for identifying the character strings and calculating the degree of matching by comparison of the character strings, in addition to the known pattern matching method, a calculating method using artificial intelligence (AI) utilizing a learning algorithm such as deep learning may be adopted.

On the left side of FIG. 9, a sensed image Fc2 obtained in step S305 is shown. On the right side of FIG. 9, a reference image Fs serving as an example of the reference image 531 is shown. The reference image Fs is the same as the reference image Fs on the right side of FIG. 8.

In the sensed image Fc2, a region is depicted which includes a portion of a fuel tank t2 and a fuel pipe p2 connecting a filler neck and the fuel tank t2 together. In the region described above, a display tag Tg2 is stuck to the surface of the fuel tank t2. In the display tag Tg2, a character string n2 indicating the type of fuel tank t2 and a barcode b2 including the information of the type of fuel tank t2 and the like are described.

The type of fuel tank t2 depicted in the sensed image Fc2 is different from the type of fuel tank t1. Hence, the "W2" of the character string n2 described in the display tag Tg2 depicted in the sensed image Fc2 and the "V1" of the character string ns described in the display tag Tgs depicted in the sensed image Fs are different from each other. Hence, in the example of FIG. 9, this inspection is determined to be "failed" (NG).

As shown in FIG. 6, in the part inspection device 500, the storage control unit 514 transmits the result of the part inspection and the images used in the inspection to the part inspection result storage device 200 through the factory network 790, and stores them in the hard disk 220 of the part inspection result storage device 200 (step S315). Here, the display control unit 513 utilizes the image obtained in step S305 and the result of the part inspection of step S310 to display the part inspection result display window on the display unit 520 of the part inspection device 500.

In the record on the upper side of the two records shown in FIG. 4, the result of the part inspection shown in FIG. 9 is recorded. Specifically, a "fuel tank erroneous component inspection" is performed on the vehicle 900 having the vehicle ID of "12345", and here, the production instruction of "V1" is received from the control device 700, the result of the inspection is determined to be "failed (NG)" and the image file name "AAAA. jpg" of the sensed image Fc2 shown in FIG. 9 is recorded. The "fuel tank erroneous component inspection" described above means an inspection for identifying whether an erroneous type of fuel tank is attached, that is, whether the right type of fuel tank is attached. Since the corresponding manufacturing step P11 is the step of "attachment of the fuel tank", the production instruction of "V1" corresponds to an instruction indicating that "whether the right type of fuel tank of "V1" is attached is inspected".

In the record on the lower side of FIG. 4, a "connector attachment inspection" is performed on the vehicle 900 having the same vehicle ID of "12345", and here, the production instruction of "220L" is received from the control device 700, the result of the inspection is determined to be "passed (OK)" and the image file name "BBBB. jpg" of the sensed image used at that time is recorded. The production instruction of "220L" means an instruction indicating that, in the immediately preceding part manufacturing step P11, whether a cable is properly attached to the connector of the type of "220L" is inspected".

Figure 10:
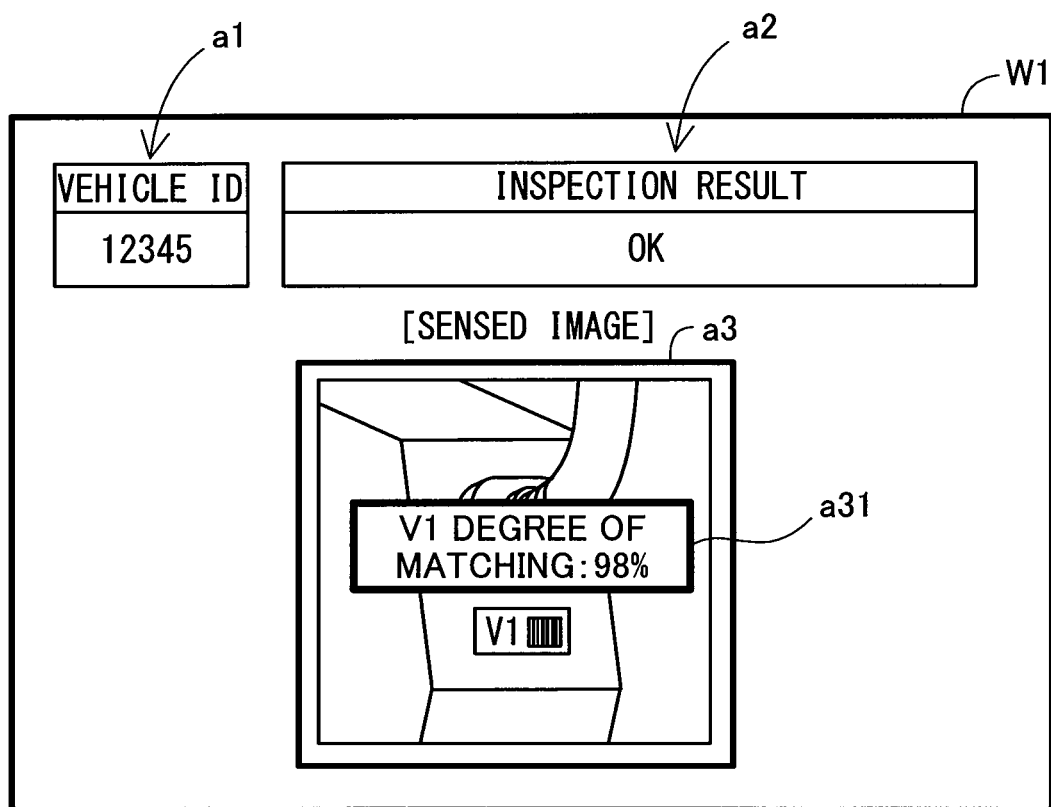
FIG. 10 is an illustrative view showing an example of a part inspection result display window displayed on the display unit of the part inspection device in S315.

FIG. 10 is an illustrative view showing an example of the part inspection result display window W1 displayed on the display unit 520 of the part inspection device 500 in step S315.

The part inspection result display window W1 includes a vehicle ID display portion a1, an inspection result display portion a2 and a sensed image display portion a3. In the vehicle ID display portion a1, the vehicle ID is displayed. In the inspection result display portion a2, the result of the part inspection is displayed. In the sensed image display portion a3, the sensed image used in the part inspection is displayed.

In FIG. 10, details corresponding to the result of the part inspection shown in FIG. 8 are displayed on the part inspection result display window W1. Specifically, in the vehicle ID display portion a1, the vehicle ID of "12345" is displayed, in the inspection result display portion a2, "OK (passed)" is displayed and in the sensed image display portion a3, the sensed image Fc1 is displayed. In the sensed image display portion a3, a degree-of-matching display portion a31 indicating the degree of matching is displayed. In the degree-of-matching display portion a31, the character string of "V1" indicating the type of fuel tank and the degree of matching identified in the part inspection are displayed. Although not shown in the figure, for example, when as shown in FIG. 9, the result of the part inspection is NG (failed), on the part inspection result display window W1, the vehicle ID "12345" is displayed in the vehicle ID display portion a1, "NG (failed)" is displayed in the inspection result display portion a2, the sensed image Fc2 shown in FIG. 9 is displayed in the sensed image display portion a3 and, for example, "15%" which is lower than the predetermined degree of matching is displayed in the degree-of-matching display portion a31.

As shown in FIG. 6, when the result of the part inspection is failed, rework (recovery measure) is performed in principle (step S320). An operator checks the details of the part inspection result display window W1 displayed in the part inspection device 500 to be able to easily see whether or not rework is needed. In other words, when the result of the inspection is "NG (failed)", it is found that rework is needed. In addition, the sensed image displayed in the sensed image display portion a3 is checked, and thus it is found that a different type of tank is currently attached. When the production line PL is stopped so that rework is performed, the part inspection device 500 may notify the control device 700 that the production line PL is stopped.

Although not shown in FIG. 6, steps S105 and S110 to be performed by the factory production system, step S205 to be performed by the manufacturing performing unit and steps S305 to S320 to be performed by the part inspection performing unit are performed on each of all parts necessary for the manufacturing of the vehicle 900. Consequently, for the parts of each vehicle 900, the results of the part inspections and the sensed images are recorded in the inspection result database 221 of the part inspection result storage device 200.

When the result of the part inspection is failed (NG) and thus rework is performed, in the present embodiment, the operator writes "rework is completed" in a slip (hereinafter referred to as a "vehicle slip") stuck to the vehicle 900.

On the other hand, it is likely that it takes a longer time to perform the part manufacturing step P11 (step S205) than planned and that thus a lack of man-hours in the part inspection step P12 is caused. In this case, it is likely that although the part inspection using the sensed image is performed with the part inspection device 500, rework is not performed and that the vehicle 900 is transported to the subsequent part manufacturing step P11 in the production line PL. In such a case, in the present embodiment, the operator writes "rework is not completed" in the vehicle slip. Since the part inspection is performed even in such a case, the result of the inspection, the file name of the sensed image and the like are recorded in the inspection result database 221, and the sensed image is stored in the hard disk 220.

It is likely that since the result of the part inspection is failed (NG), the operator checks the actual thing, and that thus it is found that the result of the inspection is erroneous. Such an erroneous determination may occur, for example, when a threshold value for the degree of matching is set to a very high value (for example, 98.5%) in order to prevent the inspection from being determined to be "passed" though the inspection is originally failed. In such a case, the operator (inspector) does not perform rework. However, it is likely that the operator performs erroneous recognition, that is, that the correct determination is made by the part inspection device 500. Hence, the inspector of the part inspection writes, in the vehicle slip, for the inspector of the completion inspection, the details of the inspection of the inspection item on the corresponding part which are requested. As described above, cases where "failed" is recorded in the inspection result database 221 include a case where the part inspection is determined to be failed and where rework is thereafter performed, a case where the part inspection is determined to be failed and where rework is not thereafter performed and a case where the part inspection is determined to be failed but where such a determination is determined by the operator to be erroneous.

When all steps P11 and P12 are completed, that is, when the manufacturing and the part inspections of all the parts are completed, as shown in FIG. 6, in the factory production system, the control device 700 transmits the production instruction to the completed vehicle inspection terminal 100 serving as the completion inspection performing unit (step S115).

When the completed vehicle inspection terminal 100 receives the production instruction through the factory network 790, the failed part identification unit 112 makes an inquiry about the result of the part inspection on the vehicle 900 having the vehicle ID included in the production instruction to the part inspection result storage device 200 (step S405). When in the part inspection result storage device 200, the cooperation control unit 212 receives the inquiry transmitted in step S405, the cooperation control unit 212 controls the storage control unit 211 to read the record of the part inspection on the vehicle ID from the inspection result database 221, and transmits the record together with the sensed image (step S330).

When the completed vehicle inspection terminal 100 receives the result of the part inspection, the completed vehicle inspection terminal 100 performs a display corresponding to the result (step S410), a determination as to whether or not a reinspection is needed (step S420) and post-processing (step S430). Steps S405, S410, S420 and S430 described above are performed as a portion of the completion inspection guide processing. The completion inspection guide processing will be described below with reference to FIG. 11.

Figure 11:
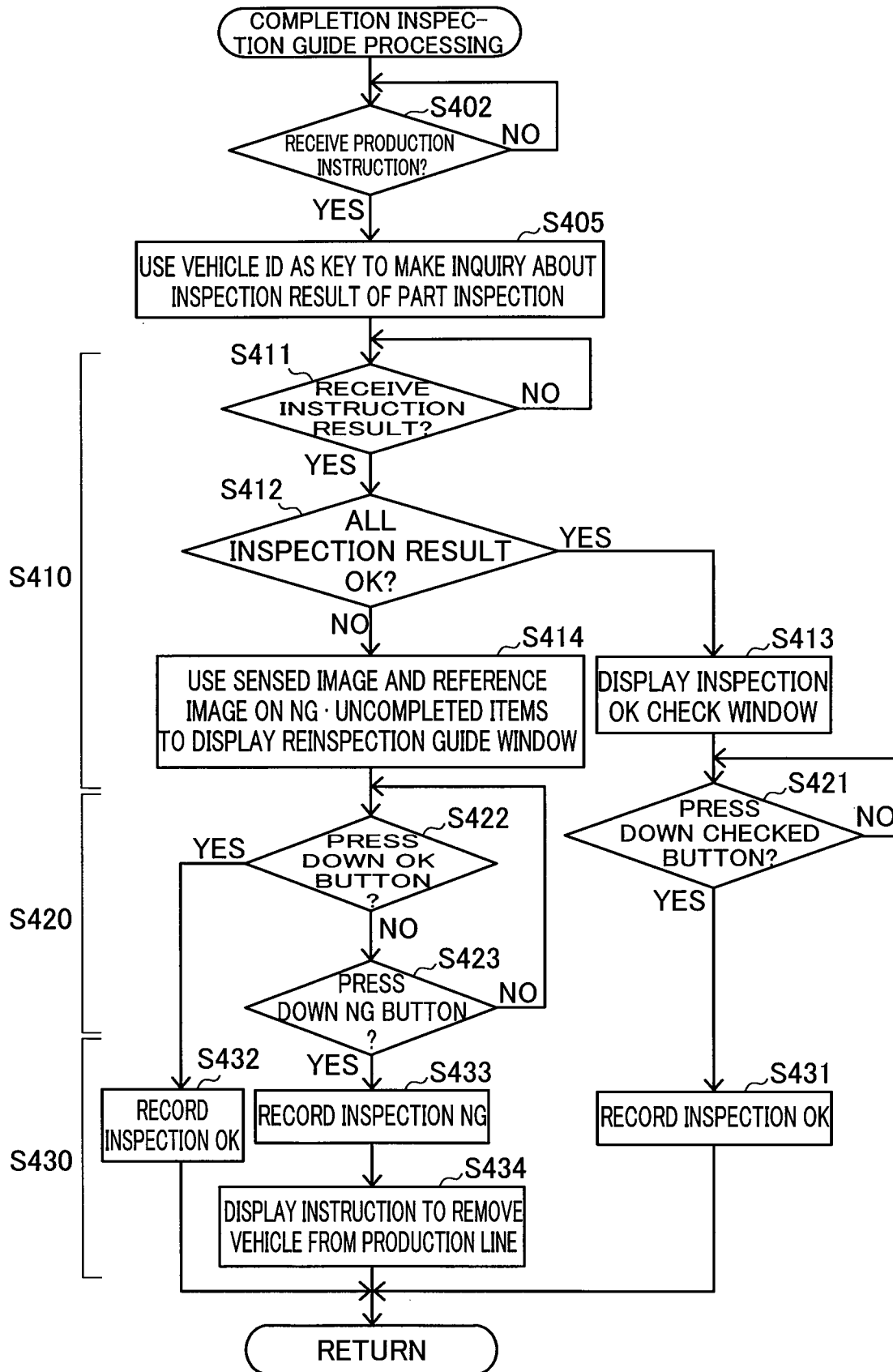
FIG. 11 is a flowchart showing a procedure for completion inspection guide processing.

FIG. 11 is a flowchart showing a procedure for the completion inspection guide processing. The completion inspection guide processing is started when the power of the completed vehicle inspection terminal 100 is turned on. The inspection result acquisition unit 111 determines whether or not the production instruction is received from the control device 700 (step S402), and when the inspection result acquisition unit 111 determines that the production instruction is not received (step S402: no), step S402 is performed again. On the other hand, when the inspection result acquisition unit 111 determines that the production instruction is received (step S402: yes), step S405 described above is performed, and thus the inquiry is made about the results of the part inspections to the part inspection result storage device 200.

The failed part identification unit 112 determines whether or not the results of the part inspections are received (step S411). When the failed part identification unit 112 determines that the results of the part inspections are not received, step S411 is performed again. On the other hand, when the failed part identification unit 112 determines that the results of the part inspections are received (step S411: yes), the failed part identification unit 112 analyzes the received results of the inspections to identify a part which is determined not to be passed, that is, a part (hereinafter referred to as a "failed part") in which "failed" is recorded in the inspection result field, and determines whether or not all the results of the inspections are passed (OK) (step S412).

When not all the results of the inspections are passed (OK), that is, when any one of the results of the inspections includes a failed (NG) part and a failed (NG) inspection item (step S412: no), on the failed part and the failed inspection item, the sensed image used in the part inspection and the reference image are used to display the inspection guide window on the display unit 120 (step S414).

Figure 12:
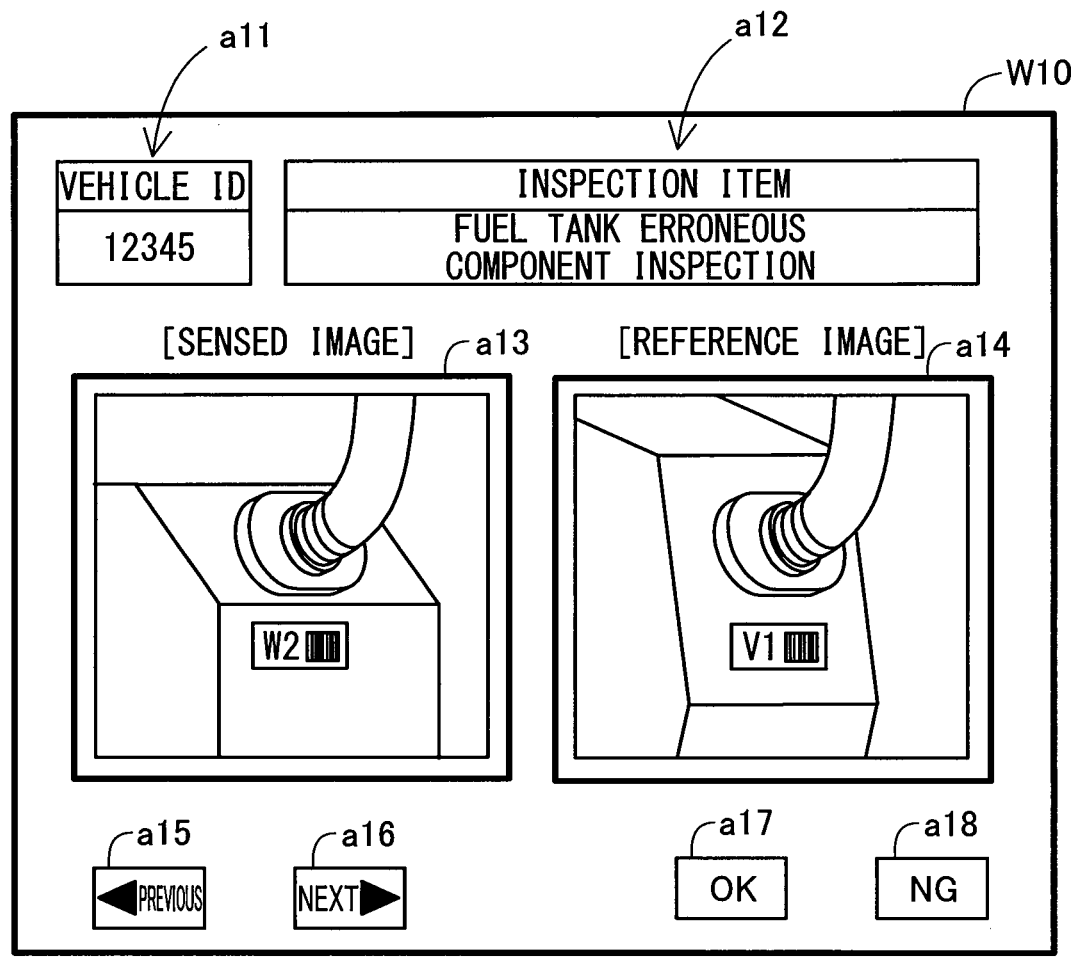
FIG. 12 is an illustrative view showing an example of an inspection guide window.

FIG. 12 is an illustrative view showing an example of the inspection guide window W10. The inspection guide window W10 is a window which prompts the inspector to perform, on the part corresponding to the failed inspection item, the inspection of the inspection item.

The inspection guide window W10 includes a vehicle ID display portion a11, an inspection item display portion a12, a sensed image display portion a13, a reference image display portion a14, a previous button a15, a next button a16, an OK button a17 and an NG button a18. In the vehicle ID display portion a11, the vehicle ID in which the result of the part inspection is failed is displayed. In the inspection item display portion a12, the failed inspection item is displayed. In the sensed image display portion a13, the sensed image used in the part inspection is displayed. In the reference image display portion a14, the reference image is displayed. The previous button a15 is a button for returning the part and the inspection item displayed on the inspection guide window W10 to the preceding record. The next button a16 is a button for advancing the part and the inspection item displayed on the inspection guide window W10 to the subsequent record. The OK button a17 is pressed by the inspector of the completed vehicle inspection when the inspector confirms that the result of the completion inspection is passed (OK). The NG button a18 is pressed by the inspector of the completed vehicle inspection when the inspector confirms that the result of the completion inspection is failed (NG).

In FIG. 12, a display is produced on the part and the inspection item in which the result of the part inspection shown in FIG. 9 is failed (NG). Specifically, when in the vehicle having the vehicle ID of "12345", an erroneous type of fuel tank is attached and thus the part inspection is failed, in the inspection item display portion a12, "fuel tank erroneous component inspection" is displayed as the inspection item, in the sensed image display portion a13, the sensed image Fc2 shown in FIG. 9 is displayed and in the reference image display portion a14, the reference image Fs is displayed.

The inspector of the completed vehicle inspection checks the details written in the vehicle slip and utilizes, according to the details, details displayed on the inspection guide window W10 so as to perform the completed vehicle inspection. Specifically, when "rework is completed" is written in the vehicle slip, the inspector checks the inspection guide window W10 to be able to easily see in which inspection item the part inspection is failed, and that rework has been performed. Hence, the inspector checks whether or not the rework of the part in the actual thing is satisfactory or compares the reference image and the actual thing to be able to perform the inspection on the inspection item. When "rework is not completed" is written in the vehicle slip, the inspector checks the inspection guide window W10 to be able to easily see in which inspection item the part inspection is failed and what rework is needed. Hence, it is possible to thereafter perform the rework. When information indicating that "the result of the part inspection is erroneously determined and thus a redetermination is requested" is written in the vehicle slip, the inspector compares the sensed image displayed in the sensed image display portion a13 of the inspection guide window W10 and the image displayed in the reference image display portion a14 to be able to perform reinspection. Here, it is possible to perform the inspection on a part in which it is difficult to perform the inspection by checking the actual thing because the part is covered with other parts in the state of the completed vehicle.

When the result of the completion inspection is passed, the inspector operates the operation unit 160 to press down the OK button a17. On the other hand, when the result of the completion inspection is failed, the inspector operates the operation unit 160 to press down the NG button a18.

As shown in FIG. 11, after the completion of step S414, in the completed vehicle inspection terminal 100, the display control unit 113 determines whether or not the OK button a17 is pressed down (step S422), and when the display control unit 113 determines that the OK button a17 is pressed down (step S422: yes), the cooperation control unit 114 records, in the hard disk 220 of the part inspection result storage device 200, "passed (OK)" which is the result of the completion inspection (step S432).

When the display control unit 113 determines that the OK button a17 is not pressed down (step S422: no), the display control unit 113 determines whether or not the NG button a18 is pressed down (step S423). When the display control unit 113 determines that the NG button a18 is not pressed down (step S423: no), the processing returns to step S422 described above. On the other hand, when the display control unit 113 determines that the NG button a18 is pressed down (step S423: yes), the cooperation control unit 114 records, in the hard disk 220 of the part inspection result storage device 200, "failed (NG)" which is the result of the completion inspection (step S433). The display control unit 113 displays, on the inspection guide window W10, an instruction indicating that "the vehicle 900 is removed from the production line PL" (step S434).

When in step S412 described above, all the inspection items are determined to be passed (OK) (step S412: yes), the display control unit 113 displays an inspection OK check window on the display unit 120 (step S413).

Figure 13:
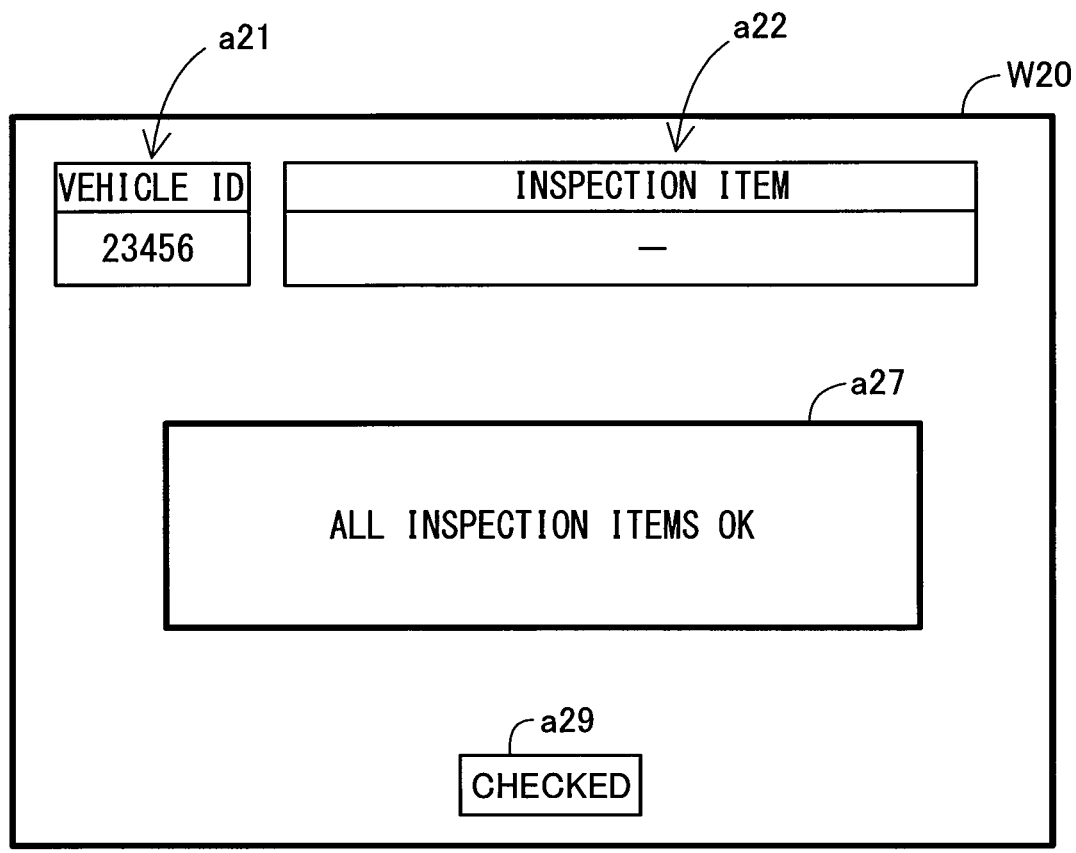
FIG. 13 is an illustrative view showing an example of an inspection OK check window.

FIG. 13 is an illustrative view showing an example of the inspection OK check window W20. The inspection OK check window W20 includes a vehicle ID display portion a21, an inspection item display portion a22, a message display portion a27 and a checked button a29.

In the vehicle ID display portion a21, the vehicle ID is displayed. In the inspection item display portion a22, a specific inspection item is not displayed, and "-" is simply displayed. In the message display portion a27, a character string of "all inspection items are passed (OK)" is displayed. The inspector checks the character string to be able to see that the inspections of all the inspection items on the vehicle 900 having the corresponding vehicle ID are completed and that the results of all the inspection items are passed (OK). After the inspector checks the character string displayed in the message display portion a27, the inspector presses down the checked button a29.

As shown in FIG. 11, after the completion of step S413, the display control unit 113 determines whether or not the checked button a29 is pressed down (step S421), and when the display control unit 113 determines that the checked button a29 is not pressed down (step S421: no), step S421 is performed again. On the other hand, when the display control unit 113 determines that the checked button a29 is pressed down (step S421: yes), the cooperation control unit 114 records, in the hard disk 220 of the part inspection result storage device 200, "passed (OK)" which is the result of the completion inspection (step S431). Step S431 described above is the same as step S432 described previously.

When any one of steps S431, S432 and S434 described above is completed, the completion inspection guide processing is completed.

In the vehicle inspection system 10 of the present embodiment described above, since the display unit 120 of the completed vehicle inspection terminal 100 used in the completed vehicle inspection displays, only on a part corresponding to a failed item, information indicating the part (for example, a "fuel tank") and information indicating the failed item (for example, an erroneous component inspection), the inspector who performs the completed vehicle inspection is able to easily discriminate the part corresponding to the failed item from the other parts and is also able to easily check the failed item. Hence, as the completed vehicle inspection, only on the part corresponding to the failed item, it is possible to inspect the failed item, and on the other parts, it is possible to prevent the inspection items overlapping the part inspections from being inspected, and it is also possible to perform the inspections of the parts without omission. Therefore, in the vehicle inspection method of the present embodiment, it is possible to reduce the overlapping of the inspection items between the part inspections and the completed vehicle inspection without unnecessarily omitting inspection items.

The results of the part inspections of the parts stored in the hard disk 220 of the part inspection result storage device 200 are acquired, the results of the part inspections are utilized to identify the part corresponding to the failed item and information indicating the identified part corresponding to the failed item and the failed item are displayed on the display unit 120 of the completed vehicle inspection terminal 100, with the result that it is possible to display, on the display unit 120, accurate information as the information indicating the identified part (for example, the "fuel tank") corresponding to the failed item and the information indicating the failed item (for example, the erroneous component inspection). In addition, since the part corresponding to the failed item and the failed item are identified with the failed part identification unit 112, as compared with a configuration in which the identification described above is performed by the inspector, it is possible to reduce an operational burden.

Since the display unit 120 of the completed vehicle inspection terminal 100 displays, in addition to the information indicating the part corresponding to the failed item and the information indicating the failed item, the sensed image of the part corresponding to the failed item, when rework (step S320) is not completed in the part inspection step P12 due to, for example, a lack of man-hours, the inspector of the completed vehicle inspection is able to easily check, based on the sensed image displayed, the part and the item which need to be subjected to rework. In a case where a question arises as to the result of the part inspection and the inspection is performed again in the completed vehicle inspection, even when the part is covered with other parts, it is possible to perform the inspection by use of the sensed image obtained in the part inspection. Hence, it is possible to efficiently perform the inspection, for example, without removing the other parts, with the result that it is possible to enhance productivity.

In the part inspection step P12, when the position of the vehicle 900 is acquired and the acquired position matches a position which is previously set for image sensing performed by the image sensing device 501, the image sensing is performed, with the result that it is possible to sense an image of a part to be inspected with timing suitable for planned image sensing. Hence, an image of the part to be inspected is sensed in the position suitable for the inspection in a suitable direction, and thus it is possible to obtain the sensed image suitable for the inspection, with the result that it is possible to enhance the accuracy of the inspection.

B. Other Embodiments (B1) Although in the embodiment described above, the failed part and the failed inspection item are displayed on the inspection guide window W10, in addition to them, passed parts and passed inspection items may be displayed. For example, for a part where a failed item is present in a portion thereof, in addition to the failed inspection item, passed inspection items may be displayed on the inspection guide window W10. A screen on which the parts are displayed in a list may be newly provided, the parts may be listed in the list and information indicating whether or not at least one inspection item of each of the parts is failed may be displayed so as to be associated with the parts. For example, on the inspection OK check window W20, the details of the passed inspection items may be displayed.

(B2) Although in the production line PL of the embodiment described above, a plurality of part manufacturing steps P11 and a plurality of part inspection steps P12 are included according to a plurality of parts, only a single part manufacturing step P11 and a single part inspection step P12 may be included. In the configuration described above, since a single part is failed, information (for example, the "fuel tank") indicating the part described above does not need to be recorded in the inspection result database 221. Likewise, the information described above does not need to be displayed on the inspection guide window W10 in the display unit 120 of the completed vehicle inspection terminal 100. Specifically, in the configuration described above, in each of the records of the inspection result database 221, the vehicle ID, the inspection item of "erroneous component inspection", the result of the "failed" or "passed" inspection and the sensed image may be recorded.

(B3) In the embodiment described above, the sensed image used in the part inspection does not need to be stored in the hard disk 220 together with the result of the inspection. In the configuration described above, the inspector of the completion inspection checks the inspection item on the inspection guide window W10 displayed on the display unit 120 of the completed vehicle inspection terminal 100 to be able to find which inspection item is failed. Hence, in the configuration described above, it is also possible to prevent the inspection item passed in the part inspection from being repeatedly inspected.

(B4) In the embodiment described above, when in step S305 performed by the part inspection performing unit, the position of the vehicle 900 is acquired, and the position matches the predetermined image sensing position, image sensing is performed. However, the present disclosure is not limited to this configuration. In a predetermined time range including timing with which the position of the vehicle 900 matches the predetermined image sensing position, image sensing may be performed a plurality of number of times to obtain a plurality of sensed images. In the configuration described above, among the sensed images obtained, based on the degree of matching in a sensed image in which the degree of matching of the sensed image and the reference image is the highest, the part inspection may be performed.

(B5) Although in the embodiment described above, the production line PL is provided within the factory, the production line PL may include a line outside the factory. For example, a manufacturing line of a part itself which is attached in the part manufacturing step P11 and which is different from the line transported with the transport device 810 may be included in the production line PL. In the configuration described above, the result of the inspection in the inspection step of the manufacturing line of the part itself may be recorded in the inspection result database 221 of the part inspection result storage device 200 through an unillustrated external network and the factory network 790. In the configuration described above, the same effects as in the embodiment described above are also achieved.

(B6) Although in the embodiment described above, the inspection guide window W10 is displayed on the display unit 520 of the part inspection device 500, instead of the display unit 520, the inspection guide window W10 may be displayed on a display device which is configured to be able to communicate with the part inspection device 500. Likewise, although the inspection OK check window W20 is displayed on the display unit 120 of the completed vehicle inspection terminal 100, instead of the display unit 120, the inspection OK check window W20 may be displayed on a display device which is configured to be able to communicate with the completed vehicle inspection terminal 100. In the configuration described above, the same effects as in the embodiment described above are also achieved.

(B7) Although in the embodiment described above, the image sensing device 501 is fixedly installed in the predetermined position of the production line PL, the present disclosure is not limited to this configuration. The operator who performs the part manufacturing step P11 and the part inspection step P12 may hold an image sensing device such as a smart phone or a potable camera to sense an image of a part to be operated after the completion of the operation. The operator described above may previously put on a wearable camera in the form of a headset to sense an image of the part to be operated after the completion of the operation. Furthermore, an image sensing camera is attached to the tip of a robot hand, and the movement thereof is controlled as with an operational robot hand in the part manufacturing step P11, with the result that an image of the part to be operated may be sensed.

(B8) Although in the embodiment described above, the part inspection is certainly performed, it is likely that the manufacturing of a part is completed but the vehicle 900 is transported to the subsequent step without the part inspection including image sensing being performed due to a lack of man-hours. In this case, information indicating that "inspection is not completed" may be stored in the inspection result field of the inspection result database 221. Then, in step S412 for the completion inspection guide processing, the inspection result of "inspection is not completed" may be determined to be the inspection item of "failed". In other words, the inspection item of "inspection is not completed" corresponds to a "failed item", that is, an "inspection item which is determined not to be passed" in the present disclosure. Instead of the part and the inspection item of the failed inspection, the part and the inspection item of the uncompleted inspection may be stored in the inspection result database 221 and displayed on the inspection guide window W10.

(B9) In the embodiment described above, in the pass/fail determination of the part inspection, when the degree of matching of the sensed image and the reference image falls in a predetermined range, and is specifically equal to or greater than the predetermined degree of matching (for example, 97%), the part inspection is determined to be "passed" whereas when the degree of matching falls outside the range described above, the part inspection is determined to be "failed". However, the present disclosure is not limited to this configuration. For example, as the range for the degree of matching, three or more ranges like a first range, a second range and a third range in an ascending order may be previously set, and when the degree of matching obtained by actual comparison of the images falls within the first range, the part inspection may be determined to be "passed", when the degree of matching falls within the second range, the part inspection may be determined to be "deemed passed" and when the degree of matching falls within the third range, the part inspection may be determined to be "failed". Then, in the example described above, the parts and the inspection items of "deemed passed" and "failed" other than "passed" may be displayed on the completed vehicle inspection terminal 100.

(B10) Although in the embodiment described above, as the inspection items in the part inspections, the inspection item of "whether the correct component to be assembled is assembled (erroneous component inspection)", the inspection item of "whether the component is securely assembled" and the inspection item of "whether a scratch is not made in the component" are illustrated, the present disclosure is not limited to these illustrations. For example, in a step of assembling a temperature sensor, an item (performance deficiency inspection) for determining whether or not the assembled component realizes a predetermined function such as an inspection item of "whether it is possible to measure a correct temperature" may be used as the inspection item in the part inspection. Likewise, an item of "whether an exhaust gas purification rate falls within a predetermined numerical range" in a step of assembling an exhaust gas purification device and an item of "whether the flow rate of cooling water falls within a predetermined numerical range" in a step of assembling a coiling water pump may be used as the inspection items in the part inspections.

(B11) The vehicle inspection system 10 of the embodiment described above is simply an example, and variations thereof are possible. For example, in the embodiment described above, in step S510, the acquisition of the position of the vehicle 900 is realized by the inquiry to the transport control device 812 and the reception of the result of detection of the information of the wireless tag attached to the vehicle 900 performed by the sensor. However, either of the inquiry to the transport control device 812 and the reception of the result of detection performed by the sensor may be omitted. Although the identification of the part and the inspection item of the failed part inspection is performed by the completed vehicle inspection terminal 100, the identification described above may be performed by the part inspection result storage device 200. In the configuration described above, the completed vehicle inspection terminal 100 may make an inquiry about the vehicle ID of the vehicle 900, the part and the inspection item of the failed part inspection to the part inspection result storage device 200, and the part inspection result storage device 200 may search the records corresponding to the inquiry and transmit, as a replay, to the completed vehicle inspection terminal 100, the vehicle ID, the part and the inspection item which are found and recorded in the records. Although in the embodiment described above, an image of the part to be operated in the part manufacturing step P11 is sensed, instead of or in addition to the sensing of an image of the part, an image of the operation of the part may be sensed as a still image or moving images. Then, by use of the still image or the moving images obtained, whether or not the operation itself is satisfactory (passed or failed) may be determined. For example, whether a correct tool is used in the assembly of the component or whether the amount of operation of a tool (for example, the number of revolutions of a screw) is appropriate may be determined. Although in the embodiment described above, the information indicating that "rework is completed", "rework is not completed" or "the result of the part inspection is erroneously determined and thus a redetermination is requested" is written in the vehicle slip stuck to the vehicle 900, the present disclosure is not limited to this configuration. The information described above may be input to the part inspection device 500 and recorded in the inspection result database 221 of the part inspection result storage device 200. In the configuration described above, in the completed vehicle inspection, the information described above may be displayed on the inspection guide window W10.

(B12) In the embodiment described above, a portion of the configuration realized by hardware may be replaced by software, and a portion of the configuration realized by software may also be replaced by hardware. For example, at least one function unit of the image sensing control unit 511, the part inspection performing unit 512, the display control unit 513, the storage control unit 514, the cooperation control unit 515, the storage control unit 211, the cooperation control unit 212, the inspection result acquisition unit 111, the failed part identification unit 112, the display control unit 113 and the cooperation control unit 114 may be realized by an integrated circuit, a discrete circuit or a module obtained by combing the circuits. When a portion or all of the functions of the present disclosure are realized by software, the software (computer programs) may be provided while being stored in a computer-readable recording medium. The "computer-readable recording medium" is not limited to a portable recording medium such as a flexible disc or a CD-ROM and includes internal storage devices within a computer such as various types of RAMs and ROMs and an external storage device fixed in a computer such as a hard disk. In other words, the "computer-readable recording medium" has a broad meaning including an arbitrary recording medium capable of fixing data packets not temporarily but permanently.

The present disclosure is not limited to the embodiments described above, and is able to be realized by various configurations without departing from the spirit thereof. For example, the technical features in the embodiments corresponding to the technical features in the aspects described in the SUMMARY may be replaced or combined as necessary so that a portion or all of the problems described above are solved or a portion or all of the effects described above are achieved. When the technical features are not described in the present specification as essential features, they may be deleted as necessary. For example, the present disclosure may be realized by embodiments described below.

[1] According to an embodiment of the present disclosure, a vehicle inspection method in a production line of a vehicle is provided. The vehicle inspection method includes: performing a part inspection, in steps of manufacturing parts of the vehicle, the part inspection in which each of the parts after being manufactured is inspected with an inspection device and which includes one or more inspection items; storing a result of the part inspection in a storage device such that the result is associated with the part; and displaying the result of the part inspection, on a display device used in a completed vehicle inspection for inspecting a completed vehicle serving as the vehicle that is completed, information indicating at least the part of the parts corresponding to a failed item serving as the inspection item which is determined not to be passed in the result of the part inspection stored in the storage device and information indicating the failed item.

In the vehicle inspection method of the embodiment described above, since the display device used in the completed vehicle inspection displays the information indicating at least the part corresponding to the failed item and the information indicating the failed item, the inspector who performs the completed vehicle inspection is able to easily check the part corresponding to the failed item and the failed item. Hence, as the completed vehicle inspection, only on the part corresponding to the failed item, it is possible to inspect the failed item, and on the other parts, it is possible to prevent the inspection items overlapping the part inspections from being inspected, and it is also possible to perform the inspections of the parts without omission. Therefore, in the vehicle inspection method of the embodiment described above, it is possible to reduce the overlapping of the inspection items between the part inspections and the completed vehicle inspection without unnecessarily omitting inspection items.

[2] In the vehicle inspection method of the embodiment described above, in the displaying the result of the part inspection, information indicating only the part of the parts corresponding to the failed item in the result of the part inspection stored in the storage device and the information indicating the failed item may be displayed with the display device.

In the vehicle inspection method of the embodiment described above, since the information indicating only the part of the parts corresponding to the failed item in the result of the part inspection stored in the storage device and the information indicating the failed item are displayed with the display device, the inspector who performs the completed vehicle inspection is able to more easily check the part corresponding to the failed item and the failed item. [3] In the vehicle inspection method of the embodiment described above, the displaying the result of the part inspection may include acquiring, with an inspection result determination device, results of the part inspections of the parts stored in the storage device; utilizing, with the inspection result determination device, the results of the part inspections to identify the part corresponding to the failed item; and displaying, with a display control device, on the display device, information indicating the identified part corresponding to the failed item and the information indicating the failed item.

In the vehicle inspection method of the embodiment described above, the results of the part inspections of the parts stored in the storage device are acquired, the results of the part inspections are utilized to identify the part corresponding to the failed item and information indicating the identified part corresponding to the failed item and the failed item are displayed on the display device, with the result that it is possible to display, on the display device, accurate information as the information indicating the identified part corresponding to the failed item and the information indicating the failed item. In addition, since the part corresponding to the failed item and the failed item are identified with the inspection result determination device, as compared with a configuration in which the identification described above is performed by the inspector, it is possible to reduce an operational burden.

[4] In the vehicle inspection method of the embodiment described above, the performing the part inspection may include sensing, with an image sensing device, an image of each of the parts after being manufactured, storing the result of the part inspection includes storing, in the storage device, the sensed image obtained in the image sensing step such that the sensed image is associated with the part and the displaying the result of the part inspection includes displaying, on the display device, in addition to the information indicating at least the part of the parts corresponding to the failed item and the information indicating the failed item, the sensed image stored in the storage device.

In the vehicle inspection method of the embodiment described above, since in addition to the information indicating the part corresponding to the failed item and the information indicating the failed item, the sensed image of the part corresponding to the failed item are displayed on the display device, when the failed item is the inspection item in which the inspection is not completed, it is possible to complementarily perform the inspection of the part based on the sensed image which is displayed. Even when the part is hidden by other parts, since it is possible to perform the inspection based on the sensed image, it is possible to efficiently perform the inspection, for example, without removing the other parts, with the result that it is possible to more enhance productivity. In a case where the failed item does not satisfy a predetermined criterion, it is possible to check, with the sensed image which is displayed, the status of the part when the part inspection is performed, and it is possible to easily check that a recovery measure (rework) is performed after the performance of the part inspection by checking that the status is changed when the completed vehicle inspection is performed.

[5] In the vehicle inspection method of the embodiment described above, the sensing may include acquiring, with an image sensing control device, a position of the vehicle transported in the production line and causing, with the image sensing control device, the image sensing device to perform image sensing when the position of the vehicle matches a position which is previously set for the image sensing performed by the image sensing device.

In the vehicle inspection method of the embodiment described above, when the position of the vehicle is acquired and the acquired position matches the position which is previously set for the image sensing performed by the image sensing device, the image sensing is performed, with the result that it is possible to sense an image of a part to be inspected with timing suitable for planned image sensing. Hence, an image of the part to be inspected is sensed in the position suitable for the inspection in a suitable direction, and thus it is possible to obtain the sensed image suitable for the inspection, with the result that it is possible to enhance the accuracy of the inspection.

[6] In the vehicle inspection method of the embodiment described above, the failed item may include at least one of the inspection items in which an inspection is not completed and the inspection item which does not satisfy a predetermined criterion.

In the vehicle inspection method of the embodiment described above, since the failed item includes at least one of the inspection items in which the inspection is not completed and the inspection item which does not satisfy the predetermined criterion, it is possible to easily identify, in the completed vehicle inspection, the inspection item in which the inspection is not completed or the inspection item which does not satisfy the predetermined criterion.

The present disclosure is also able to be realized by various embodiments. For example, the present disclosure is able to be realized by embodiments such as a vehicle manufacturing method, a vehicle inspection system, a computer program for realizing the method or the system and a storage medium in which the computer program is stored. When the present disclosure is realized as the vehicle manufacturing method, the present disclosure is able to be realized by, for example, the embodiment of [7] below.

[7] A vehicle manufacturing method includes: manufacturing a vehicle with a plurality of steps using a plurality of components previously prepared, performing a inspection of the vehicle manufactured through the manufacturing the vehicle; and shipping, as a completed vehicle, the manufactured vehicle in which all inspection items in the inspection are determined to be passed, each of the steps of the manufacturing the vehicle includes: manufacturing a predetermined part based on an instruction; performing a part inspection in which the part after being manufactured is inspected and which includes one or more inspection items; and storing the result of the part inspection such that the result is associated with the part and is able to be read, the performing the inspection of the vehicle includes: an inspection result display step of reading the result of the part inspection and displaying information indicating the part on the inspection item which is determined not to be passed in the part inspection and information indicating the inspection item which is determined not to be passed; and determining pass/fail of dealing with the inspection item which is determined not to be passed and performing the inspection to determine whether the inspection is passed or failed and when all the inspection items are determined to be passed by the determining, the manufactured vehicle to be inspected is shipped as the completed vehicle.

What is claimed is:

1. A vehicle inspection method in a production line of a vehicle, the vehicle inspection method comprising:
performing a part inspection, in steps of manufacturing parts of the vehicle, the part inspection in which each of the parts after being manufactured is inspected with an inspection device and which includes one or more inspection items;
storing a result of the part inspection in a storage device such that the result is associated with each of the parts; and
displaying the result of the part inspection, on a display device used in a completed vehicle inspection for inspecting a completed vehicle serving as the vehicle that is completed, information indicating at least the part of the parts corresponding to a failed item serving as the inspection item which is determined not to be passed in the result of the part inspection stored in the storage device and information indicating the failed item, wherein
the performing the part inspection includes
sensing, with an image sensing device, an image of each of the parts after being manufactured, and
comparing a reference image with the sensed image obtained in the image sensing step,
the storing the result of the part inspection includes
storing, in the storage device, the sensed image obtained in the image sensing step such that the sensed image is associated with the part, and
the displaying the result of the part inspection includes
displaying, on the display device, in addition to the information indicating at least the part of the parts corresponding to the failed item and the information indicating the failed item, the sensed image stored in the storage device, and
displaying, on the display device, the sensed image stored in the storage device and the reference image of the part corresponding to the failed item side by side.

2. The vehicle inspection method according to claim 1, wherein, in the displaying the result of the part inspection, information indicating only the part of the parts corresponding to the failed item in the result of the part inspection stored in the storage device and the information indicating the failed item are displayed with the display device.

3. The vehicle inspection method according to claim 1, wherein the displaying the result of the part inspection includes
acquiring, with an inspection result determination device, results of the part inspections of the parts stored in the storage device;
utilizing, with the inspection result determination device, the results of the part inspections to identify the part corresponding to the failed item; and
displaying, with a display control device, on the display device, information indicating the identified part corresponding to the failed item and the information indicating the failed item.

4. The vehicle inspection method according to claim 1, wherein the sensing includes
acquiring, with an image sensing control device, a position of the vehicle transported in the production line and
causing, with the image sensing control device, the image sensing device to perform image sensing when the position of the vehicle matches a position which is previously set for the image sensing performed by the image sensing device.

5. The vehicle inspection method according to claim 1, wherein the failed item includes at least one of the inspection items in which an inspection is not completed and the inspection item which does not satisfy a predetermined criterion.

6. A vehicle inspection system for inspecting a vehicle in a production line of the vehicle, the vehicle inspection system comprising:
- a display device that is used in a completed vehicle inspection for inspecting a completed vehicle serving as the vehicle which is completed;
- a processor; and
- a memory storing program instructions which, when executed by the processor, cause the processor to carry out the method of claim 1.

* * * * *